United States Patent
Kuwano

(10) Patent No.: US 10,967,685 B2
(45) Date of Patent: Apr. 6, 2021

(54) PNEUMATIC TIRE

(71) Applicant: TOYO TIRE & RUBBER CO., LTD., Osaka (JP)

(72) Inventor: Shingo Kuwano, Osaka (JP)

(73) Assignee: TOYO TIRE CORPORATION, Itami (JP)

( * ) Notice: Subject to any disclaimer, the term of this patent is extended or adjusted under 35 U.S.C. 154(b) by 1007 days.

(21) Appl. No.: 15/496,132

(22) Filed: Apr. 25, 2017

(65) Prior Publication Data

US 2018/0065420 A1    Mar. 8, 2018

(30) Foreign Application Priority Data

Sep. 7, 2016 (JP) .............................. JP2016-174745

(51) Int. Cl.
*B60C 13/02* (2006.01)
*B60C 11/01* (2006.01)

(52) U.S. Cl.
CPC .............. *B60C 13/02* (2013.01); *B60C 11/01* (2013.01); *B60C 2200/14* (2013.01)

(58) Field of Classification Search
CPC ........ B60C 11/01; B60C 13/002; B60C 13/02
See application file for complete search history.

(56) References Cited

U.S. PATENT DOCUMENTS

| 6,533,007 B1 * | 3/2003 | McMannis | B60C 11/01 152/209.16 |
| 2010/0288409 A1 | 11/2010 | Ohara | |
| 2019/0016179 A1 * | 1/2019 | Yamakawa | B60C 11/0306 |
| 2019/0176531 A1 * | 6/2019 | Murata | B60C 11/0311 |

FOREIGN PATENT DOCUMENTS

| JP | H11-291718 | * 10/1999 |
| JP | 2010-264962 A | 11/2010 |
| JP | 2011-079445 | * 4/2011 |

OTHER PUBLICATIONS

English machine translation of JPH11-291718. (Year: 1999).*
English machine translation of JP2011-079445. (Year: 2011).*

* cited by examiner

*Primary Examiner* — Robert C Dye
(74) *Attorney, Agent, or Firm* — Westerman, Hattori, Daniels & Adrian, LLP

(57) ABSTRACT

In a pneumatic tire, a sidewall portion includes a plurality of projecting portions projecting in a tire width-direction. The projecting portions are placed such that at least portions of the projecting portions are superposed on a first block in a tire radial-direction as viewed in the tire width-direction. At least one of the projecting portions includes an opening which is separated from both end edges of the projecting portion in a tire circumferential-direction. A center position of the opening in the tire circumferential-direction is deviated from a center position of the projecting portion in the tire circumferential-direction.

13 Claims, 5 Drawing Sheets

PNEUMATIC TIRE

CROSS REFERENCE TO RELATED APPLICATIONS

This application claims the benefit of priority of Japanese application no. 2016-174745, filed on Sep. 7, 2016, which is incorporated herein by reference.

BACKGROUND OF THE INVENTION

Field of the Invention

The present invention relates to a pneumatic tire having a plurality of projecting portions which project in a tire width-direction.

Description of the Related Art

There are conventionally known pneumatic tires each having a plurality of projecting portions which project in a tire width-direction (e.g., JP-A-2010-264962). According to a structure of this pneumatic tire, traction performance on a mud area or a rocky area is enhanced due to resistance caused when the projecting portions shear dirt and due to friction between the projecting portions and rock, and resistance to external damage is enhanced due to increase in rubber thickness.

By the way, weight balance of the tire is prone to become uneven due to existence of the projecting portions. Accordingly, when the tire is produced (vulcanized), rubber does not smoothly flow, the tire may be chipped (bare may be generated) with respect to a desired tire shape, or uniformity may be lowered and this may cause vibration or noise of a vehicle.

SUMMARY OF INVENTION

It is an object of the present invention to provide a pneumatic tire capable of suppressing unevenness of weight balance.

There is provided a pneumatic tire, which includes:
a sidewall portion extending in a tire radial-direction; and
a tread portion having a tread surface on outer side in the tire radial-direction and connected to an outer end of the sidewall portion in the tire radial-direction, wherein
the tread portion includes a plurality of grooves extending to an outer end in a tire width-direction, and a plurality of blocks arranged in a tire circumferential-direction by being defined the blocks by the plurality of grooves,
the plurality of blocks includes a plurality of first blocks and a plurality of second blocks, outer end edges of the second blocks on the tread surface in the tire width-direction being located on an inner side in the tire width-direction than outer end edges of the first blocks on the tread surface in the tire width-direction due to recesses provided at outer ends of the second blocks in the tire width-direction,
the sidewall portion includes a plurality of projecting portions projecting in the tire width-direction,
the projecting portions are placed such that at least portions of the projecting portions are superposed on the first block in the tire radial-direction as viewed in the tire width-direction,
at least one of the projecting portions includes an opening which is separated from both end edges of the projecting portion in the tire circumferential-direction, and
a center position of the opening in the tire circumferential-direction is deviated from a center position of the projecting portion in the tire circumferential-direction.

Also, the pneumatic tire may have a configuration in which:
the center position of the opening in the tire circumferential-direction is deviated from the center position the projecting portion in the tire circumferential-direction toward a rear side of a tire rotation direction.

Also, the pneumatic tire may have a configuration in which:
the center position of the opening in the tire circumferential-direction is deviated from the center position of the projecting portion in the tire circumferential-direction toward a front side of a tire rotation direction.

Also, the pneumatic tire may have a configuration in which:
the plurality of projecting portions include a plurality of first projecting portions, at least portions of the first projecting portions are superposed on the first block in the tire radial-direction as viewed in the tire width-direction, and the plurality of projecting portions also include a plurality of second projecting portions, and at least portions of the second projecting portions are superposed on the second block in the tire radial-direction as viewed in the tire width-direction.

Also, the pneumatic tire may have a configuration in which:
a projecting amount of the first projecting portion in the tire width-direction is larger than a projecting amount of the second projecting portion in the tire width-direction, and
the opening is provided only in the first projecting portion.

Also, the pneumatic tire may have a configuration in which:
an outer end of the first projecting portion in the tire radial-direction is located on an inner side in the tire radial-direction than the tread surface of the first block.

Also, the pneumatic tire may have a configuration in which:
an outer end of the second projecting portion in the tire radial-direction is located at the same position as a bottom surface of the recess of the second block in the tire radial-direction.

Also, the pneumatic tire may have a configuration in which:
the first blocks and the second blocks are alternately placed in the tire circumferential-direction.

Also, the pneumatic tire may have a configuration in which:
at least one of the projecting portions includes the two openings,
the sidewall portion includes an annular protrusion portion projecting in the tire width-direction and extending along the tire circumferential-direction,
the first opening is placed on an inner side in the tire radial-direction than the annular protrusion portion, and
the second opening is placed on an outer side in the tire radial-direction than the annular protrusion portion.

Also, the pneumatic tire may have a configuration in which:
the projecting portion is placed such that 25% or more of the projecting portion in the tire circumferential-direction is superposed on the first block in the tire radial-direction as viewed in the tire width-direction.

Also, the pneumatic tire may have a configuration in which:

a width size between an opening edge of the opening and an end edge of the projecting portion is 1.5 mm or more.

DETAILED DESCRIPTION OF THE PREFERRED EMBODIMENTS

An embodiment of a pneumatic tire will be described below with reference to FIGS. 1 to 5. Size ratios in each of the drawings do not always match with actual size ratios, and size ratios between the drawings do not always math with each other.

Figure 1:
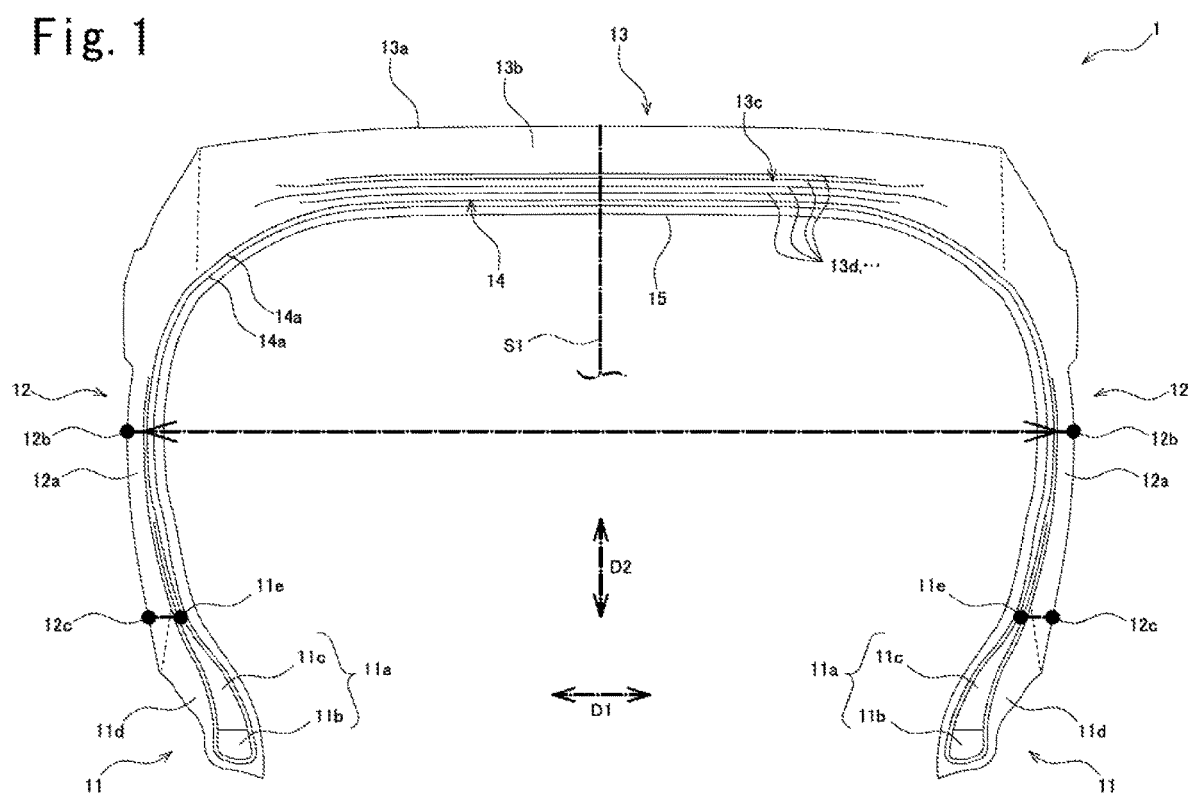
FIG. 1 is a sectional view of essential portions in a tire meridional surface of a pneumatic tire according to an embodiment.

As shown in FIG. 1, the pneumatic tire (also called "tire" simply) 1 includes a pair of bead portions 11 having beads 11a. The tire 1 includes sidewall portions 12 extending from the bead portions 11 radially outward in a tire radial-direction D2, and a tread portion 13 which is connected to outer ends of the pair of sidewall portions 12 in the tire-radial direction D2. The tread portion 13 is provided with a tread surface 13a which comes into contact with ground. The tread surface 13a is located on the outer side of in a tire radial-direction D2. The tire 1 is mounted on a rim (not shown).

The tire 1 includes a carcass layer 14 extending between the pair of beads 11a and 11a, and an inner linear 15 located on an inner side of the carcass layer 14 and facing an inner space of the tire 1 into which air is charged. The carcass layer 14 and the inner linear 15 are placed along an inner periphery of the tire over the bead portions 11, the sidewall portions 12 and the tread portion 13.

In FIG. 1 (also in the other drawings), a first direction D1 is a tire width-direction D1 which is parallel to the tire rotation axis, a second direction D2 is the tire radial-direction D2 which is a diameter direction of the tire 1, and a third direction D3 (see FIGS. 2 and 3, for example) is a tire circumferential-direction D3 which is a direction around a tire axial-direction. A tire equator surface S1 is a surface intersecting with the tire rotation axis at right angle, and is located on a center of the tire width-direction D1, and a tire meridional surface is a surface including a surface including the tire rotation axis, and intersecting with the tire equator surface S1.

Each of the bead portions 11 includes an annularly formed bead core 11b, and a bead filler 11c placed on an outer side of the bead core 11b in the tire radial-direction D2. For example, the bead core 11b is formed by laminating rubber-coated bead wires (metal wires, for example), and the bead filler 11c is formed by forming hard rubber outward of the tire radial-direction D2 in a tapered manner.

Each of the beads 11a includes a rim strip rubber 11d placed on an outer side in the tire width-direction D1 than the carcass layer 14 to configure an outer surface which comes into contact with the rim. Each of the sidewall portions 12 includes a sidewall rubber 12a which is placed on an outer side in the tire width-direction D1 than the carcass layer 14 to configure an outer surface.

The tread portion 13 includes a tread rubber 13b. An outer surface of the tread rubber 13b configures the tread surface 13a. The tread portion 13 also includes a belt portion 13c placed between the tread rubber 13b and the carcass layer 14. The belt portion 13c includes a plurality of (four in FIG. 1) belt plies 13d. For example, each of the belt plies 13d includes a plurality of belt cords (organic fiber or metal, for example) which are arranged in parallel, and topping rubbers for coating the belt cords.

The carcass layer 14 is composed of at least one (two in FIG. 1) carcass plies 14a. Each of the carcass plies 14a is folded back around the bead 11a to surround the bead 11a. Each of the carcass plies 14a includes a plurality of ply cords (organic fiber or metal, for example) which are arranged in a direction intersecting with the tire circumferential-direction D3 substantially at right angles, and topping rubbers for coating the ply cords.

To maintain the air pressure, the inner linear 15 has an excellent function to prevent gas from passing through the inner linear 15. In the sidewall portion 12, the inner linear 15 is in intimate contact with an inner periphery of the carcass layer 14, and no other material is interposed between the inner linear 15 and the carcass layer 14.

For example, in a distance between the carcass ply 14a which is placed on the innermost side and a tire inner peripheral surface (inner peripheral surface of inner linear 15), the distance of the sidewall portion 12 is 90% to 180% of the distance of the tread portion 13. More specifically, the distance of the sidewall portion 12 is 120% to 160% of the distance of the tread portion 13.

An outer surface of the sidewall portion 12 has a position 12b which becomes the same, in the tire radial-direction D2, as the tire maximum position (more specifically, maximum distance position of distance of carcass layer 14 between outer sides in tire width-direction D1). The position 12b is called a tire maximum width position 12b, hereinafter.

The outer surface of the sidewall portions 12 has a position 12c which becomes the same, in the tire radial-direction D2, as an outer end lie of the bead filler 11c in the tire radial-direction D2. The position 12c is called a bead filler outer end position 12c, hereinafter.

Figure 2:
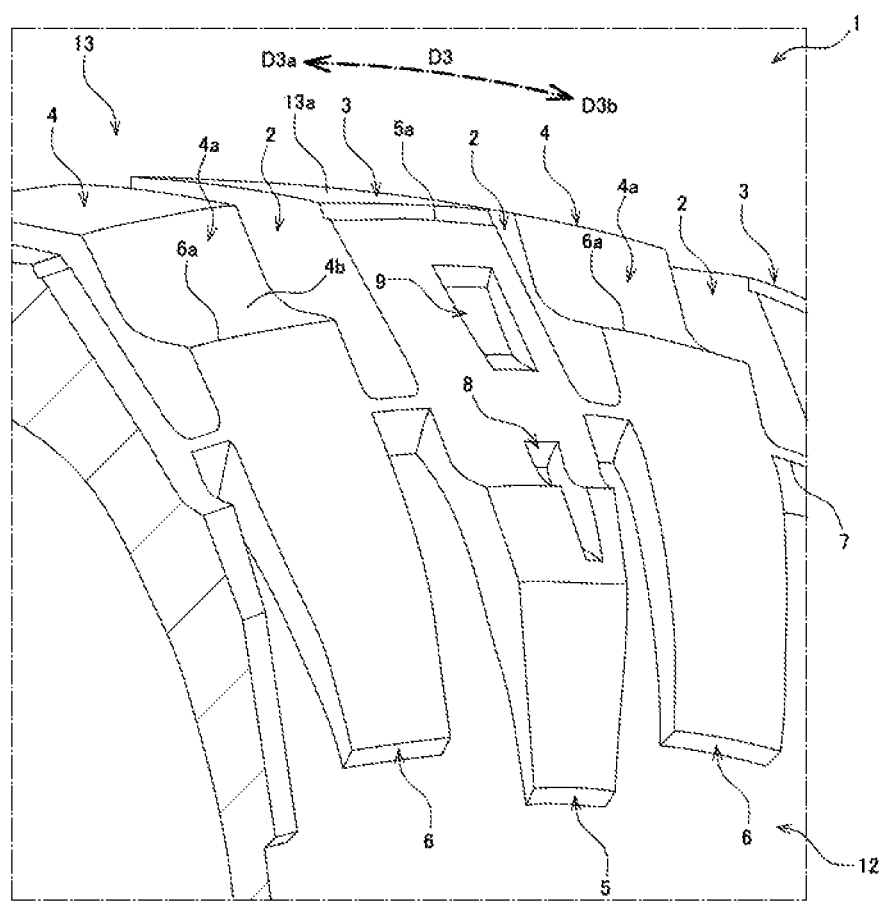
FIG. 2 is a perspective view of essential portions of the pneumatic tire of the embodiment.
Figure 3:
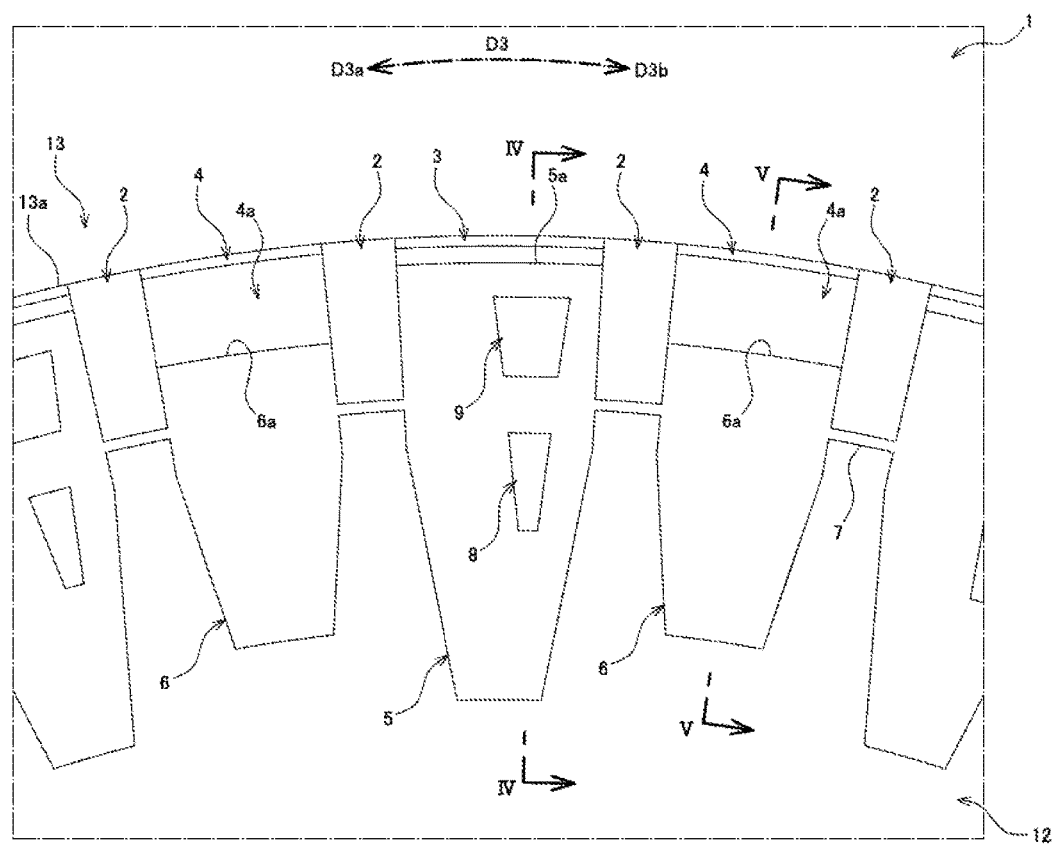
FIG. 3 is a side view of essential portions (perspective view in tire width-direction) of the pneumatic tire of the embodiment.
Figure 4:
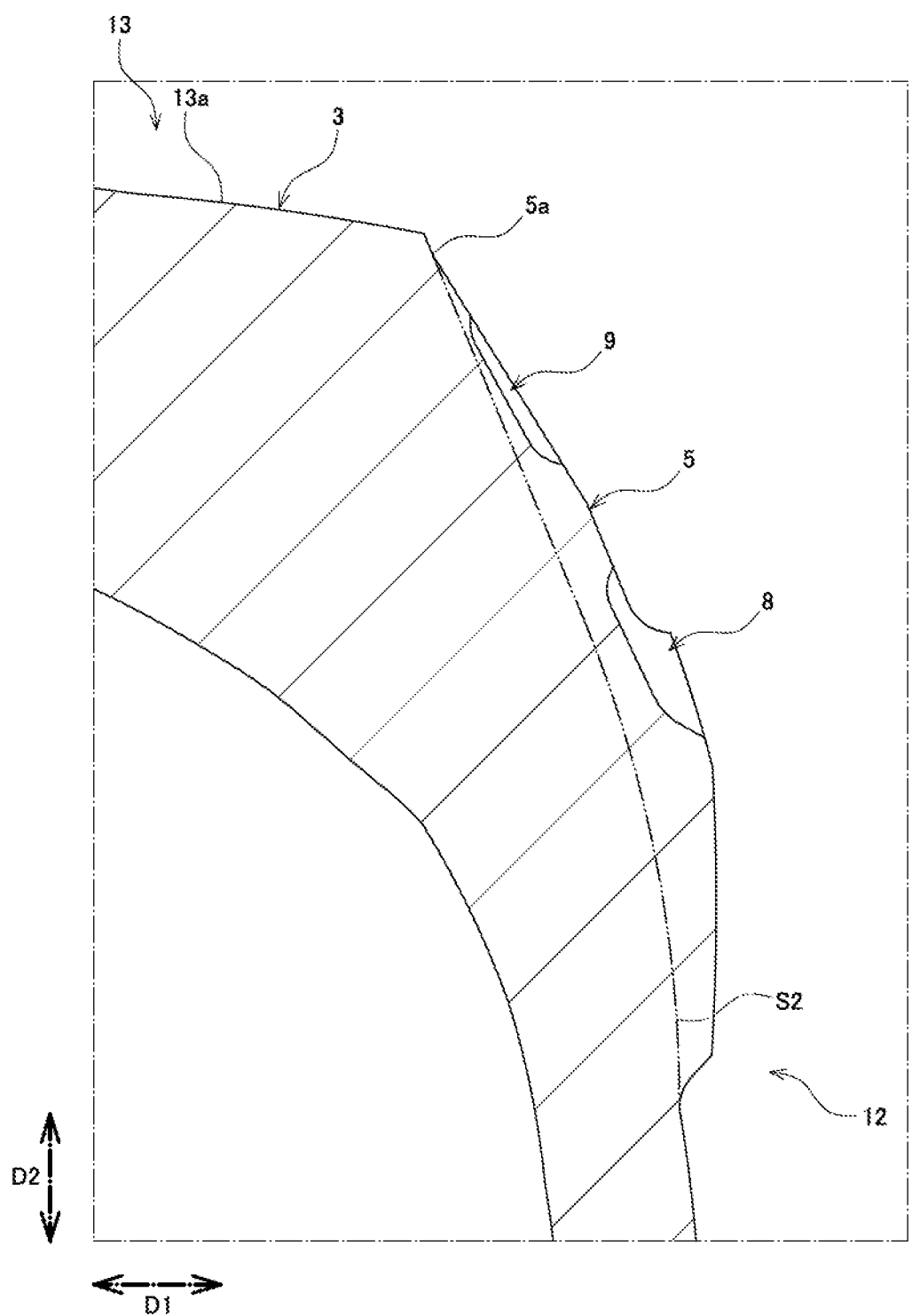
FIG. 4 is an enlarged sectional view of essential portions taken along line IV-IV in FIG. 3.
Figure 5:
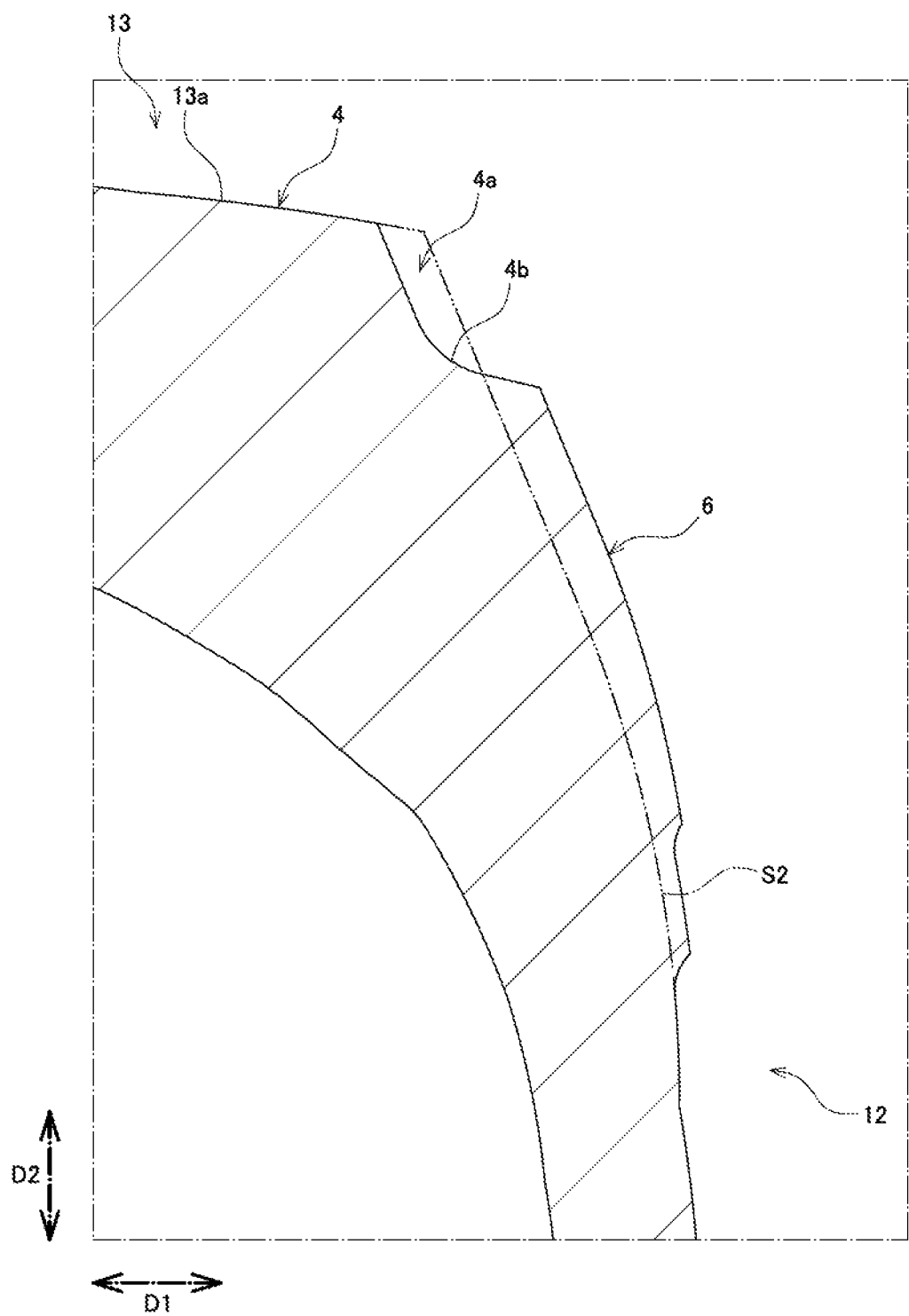
FIG. 5 is an enlarged sectional view of essential portions taken along line V-V in FIG. 3.

As shown in FIGS. 2 to 5, the tread portion 13 includes a plurality of grooves 2 extending outer end in the tire width-direction D1, and a plurality of blocks 3 and 4 which are defined by the plurality of groves 2 and arranged in the tire circumferential-direction D3. In FIGS. 4 and 5, dashed-two dotted lines show profile surfaces (reference surfaces) S2 of the tire 1.

In FIGS. 2 and 3, one direction side D3a in the tire circumferential-direction D3 also shows a tire rotation direction when the vehicle runs forward. Therefore, the one direction side D3a in the tire circumferential-direction D3 becomes a front side D3a of the tire rotation direction, and the other direction side D3b becomes a rear side D3b of the tire rotation direction.

The plurality of blocks 3 and 4 include a plurality of first blocks 3 and a plurality of second blocks 4 having recesses 4a, which are recesses with respect to a profile surface S2, at an outer end in the tire width-direction D1. An outer end edge of the second block 4 on the tread surface 13a in the tire width-direction D1 is located on an inner side in the tire width-direction D1 than the outer end edge of the first block 3 on the tread surface 13a in the tire width-direction D1.

Accordingly, the outer end edge of the tread surface 13a in the tire width-direction D1 is formed uneven as viewed in the tire radial-direction D2.

Since the uneven shapes exist, components of the surfaces and the edges are formed. Since the uneven shapes are formed on the portions of the tire which come into contact with dirt, sand and rock, areas which come into contact with the dirt, sand and rock become large, and surfaces and edges formed by the uneven shapes easily come into contact with the dirt, sand and rock of various positions. Since the uneven shapes are formed in the portions which come into contact with the dirt, sand and rock, traction performance is enhanced.

In the embodiment, the first blocks 3 and the second blocks 4 are placed alternately in the tire circumferential-direction D3. That is, blocks which are adjacent with the first blocks 3 in the tire circumferential-direction D3 are the second blocks 4, and blocks which are adjacent with the second blocks 4 in the tire circumferential-direction D3 are the first blocks 3.

The sidewall portion 12 includes a plurality of projecting portions 5 and 6 which project from the profile surface S2 in the tire width-direction D1. The sidewall portion 12 includes an annular protrusion portion 7 which projects from the profile surface S2 in the tire width-direction D1 and extends along the tire circumferential-direction D3.

The projecting portions 5 and 6 are placed outward of the sidewall portion 12 at least in the tire radial-direction D2. Accordingly, the projecting portions 5 and 6 can come into contact with mud and sand in a state where the tire 1 sinks due to a weight of the vehicle in a mud area and a sand area, and can also come into contact with the uneven rocks in a rocky area. That is, the projecting portions 5 and 6 come into contact with the ground in bad roads such as a mud area, a sand area and a rocky area. The projecting portions 5 and 6 do not normally come into contact with the ground in a flat road.

The projecting portions 5 and 6 are located on an outer side in the tire radial-direction D2 than the bead filler outer end position 12c (see FIG. 1) of the sidewall portion 12. More specifically, the projecting portions 5 and 6 are placed on the outer side in the tire radial-direction D2 than the tire maximum width position 12b (see FIG. 1) of the sidewall portion 12.

As shown in FIG. 3, the plurality of projecting portions 5 and 6 include a plurality of first projecting portions 5. At least portions of the first projecting portions 5 are interposed on the first block 3 in the tire radial-direction D2 as viewed in the tire width-direction D1. The projecting portions 5 and 6 also include a plurality of second projecting portions 6. At least portions of the second projecting portions 6 are interposed on the second block 4 in the tire radial-direction D2. For example, the projecting portions 5 and 6 are superposed on the blocks 3 and 4 by 25% or more in the tire circumferential-direction D3 (preferably 50% or more, and more preferably 75% or more) as viewed in the tire width-direction D1.

As viewed in the tire width-direction D1, the first projecting portions 5 are superposed only on the first blocks 3 in the tire radial-direction D2, and the second projecting portions 6 are superposed only on the second blocks 4 in the tire radial-direction D2. That is, the projecting portions 5 and 6 are superposed only on one of the blocks 3 and 4 in the tire radial-direction D2 as viewed in the tire width-direction D1.

The first projecting portions 5 and the second projecting portions 6 are separated from each other in the tire circumferential-direction D3. In the embodiment, the first projecting portions 5 and the second projecting portions 6 are alternately placed in the tire circumferential-direction D3. That is, a projecting portion which is adjacent with the first projecting portion 5 in the tire circumferential-direction D3 is the second projecting portion 6, and a projecting portion which is adjacent with the second projecting portion 6 in the tire circumferential-direction D3 is the first projecting portion 5.

An outer end 5a of the first projecting portion 5 in the tire radial-direction D2 is located on an inner side in the tire radial-direction D2 than the tread surface 13a of the first block 3. Accordingly, uneven shapes are formed by the tread surface 13a of the first block 3 and the outer end 5a of the first projecting portion 5 in the tire radial-direction D2. Therefore, traction performance can be enhanced.

An outer end 6a of the second projecting portion 6 in the tire radial-direction D2 is located at the same position as a bottom surface 4b of the recess 4a of the second block 4 in the tire radial-direction D2. Accordingly, a surface which is recessed from the tread surface 13a of the second block 4 (surface configured by the bottom surface 4b of the recess 4a and the outer end 6a of the second projecting portion 6) becomes large. Therefore, traction performance can be enhanced.

Each of the first projecting portions 5 includes openings 8 and 9. Accordingly, a weight is increased due to existence of the first projecting portion 5, and weights of the openings 8 and 9 are prevented from increasing. Therefore, weight balance which may be caused by the existence of the first projecting portion 5 is restrained from becoming uniform. Due to the existence of the openings 8 and 9, components of the surfaces and the edges increase, and thus traction performance is enhanced.

The openings 8 and 9 are separated from both end edges of the first projecting portion 5 in the tire radial-direction D2. Further, the openings 8 and 9 are separated from the both end edges of the first projecting portion 5 in the tire circumferential-direction D3. Accordingly, since rigidity around the openings 8 and 9 of the first projecting portion 5 can be enhanced, traction performance by the first projecting portion 5 can be maintained. For example, a distance between the opening edges of the openings 8 and 9 and the end edge of the first projecting portion 5 is 1.5 mm or more (preferably, 2.0 mm or more).

Each of the first projecting portions 5 includes the two openings 8 and 9. More specifically, the first projecting portion 5 includes the first opening 8 located on an inner side in the tire radial-direction D2, and the second opening 9 located on the outer side in the tire radial-direction D2. The first opening 8 is located on the inner side in the tire radial-direction D2 than the annular protrusion portion 7, and the second opening 9 is located on the outer side in the tire radial-direction D2 than the annular protrusion portion 7.

A projecting amount (maximum projecting amount) of the first projecting portion 5 in the tire width-direction D1 is larger than a projecting amount (maximum projecting amount) of the second projecting portion 6 in the tire width-direction D1. On the other hand, the openings 8 and 9 are formed only in the first projecting portion 5 and are not formed in the second projecting portion 6. Therefore, it is possible to suppress the unevenness of the weight balance which may be caused by a difference between the projecting amounts of the first projecting portion 5 and the second projecting portion 6.

The first opening 8 is located at a position of a portion of the first projecting portion 5 which most projects in the tire width-direction D1. Accordingly, the first opening 8 is provided at a portion of the first projecting portion 5 which has the largest volume. Therefore, it is possible to suppress the unevenness of the weight balance which may be caused by the existence of the first projecting portion 5.

As shown in FIGS. 2 and 3, center positions of the first and second openings 8 and 9 in the tire circumferential-direction D3 are deviated from the center position of the first projecting portion 5 in the tire circumferential-direction D3. More specifically, the center positions of the first and second openings 8 and 9 in the tire circumferential-direction D3 are deviated from the center position of the first projecting portion 5 in the tire circumferential-direction D3 toward the rear side D3b of the tire rotational direction.

As described above, the pneumatic tire 1 of the embodiment include a sidewall portion 12 extending in a tire radial-direction D2, and a tread portion 13 having a tread surface 13a on outer side in the tire radial-direction D2 and connected to an outer end of the sidewall portion 12 in the tire radial-direction D2. The tread portion 13 includes a plurality of grooves 2 extending to an outer end in a tire width-direction D1, and a plurality of blocks 3 and 4 arranged in a tire circumferential-direction D3 by being defined the blocks 3 and 4 by the plurality of grooves 2. The plurality of blocks 3 and 4 includes a plurality of first blocks 3 and a plurality of second blocks 4. Outer end edges of the second blocks 4 on the tread surface 13a in the tire width-direction D1 being located on an inner side in the tire width-direction D1 than outer end edges of the first blocks 3 on the tread surface 13a in the tire width-direction D1 due to recesses 4a provided at outer ends of the second blocks 4 in the tire width-direction D1. The sidewall portion 12 includes a plurality of projecting portions 5 projecting in the tire width-direction D1. The projecting portions 5 are placed such that at least portions of the projecting portions 5 are superposed on the first block 3 in the tire radial-direction D2 as viewed in the tire width-direction D1. At least one of the projecting portions 5 includes an opening 8 and 9 which is separated from both end edges of the projecting portion 5 in the tire circumferential-direction D3. A center position of the openings 8 and 9 in the tire circumferential-direction D3 are deviated from a center position of the projecting portion 5 in the tire circumferential-direction D3.

According to the above-described configuration, since the outer end of the second block 4 includes the recess 4a in the outer tire width-direction D1, the outer end edge of the tread surface 13a of the second block 4 in the tire width-direction D1 is located on the inner side in the tire width-direction D1 than that of the first block 3 in the tire width-direction D1. Therefore, since positions of the outer end edges of the first block 3 and the second block 4 are different from each other, the uneven shape exhibits the traction performance.

The outer end of the second block 4 in the tire width-direction D1 has the recess 4a. Accordingly, at the position of the second block 4, the traction performance is exhibited by the uneven shape of the second block 4 itself.

At the position of the first block 3, the projecting portion 5 is at least partially superposed on the first block 3 in the tire radial-direction D2 as viewed in the tire width-direction D1. Therefore, the traction performance is exhibited by a positional relation (uneven shape, for example) of the first block 3 and the projecting portion 5.

Due to the existence of the projecting portion 5, the rubber weight of that portion becomes large. Hence, at least one of the projecting portions 5 includes the openings 8 and 9 which are separated from both end edges of the projecting portion 5 in the tire circumferential-direction D3. Accordingly, it is possible to suppress the unevenness of the weight balance which may be caused by the existence of the projecting portion 5. Further, traction performance is exhibited by the surfaces and the edges of the openings 8 and 9.

The tire 1 becomes deformed by a weight of the vehicle when the vehicle runs for example. Hence, the center positions of the openings 8 and 9 in the tire circumferential-direction D3 are deviated from the center position of the projecting portion 5 in the tire circumferential-direction D3. Therefore, when the tire 1 becomes deformed the projecting portion 5 is deformed unevenly (asymmetrically) with respect to the center position in the tire circumferential-direction D3. According to this, since dirt (including body of sand in which dirt is dried) which enters the openings 8 and 9 is prone to be easily discharged outside of the openings 8 and 9, it is possible to enhance the dirt-discharging performance.

In the pneumatic tire 1 of the embodiment, the center position of the openings 8 and 9 in the tire circumferential-direction D3 are deviated from the center position the projecting portion 5 in the tire circumferential-direction D3 toward a rear side D3b of a tire rotation direction.

According to the above-described configuration, since center positions of the openings 8 and 9 in the tire circumferential-direction D3 are deviated from the center position of the projecting portion 5 in the tire circumferential-direction D3 toward the rear side D3b of the tire rotation direction, rigidity of the projecting portion 5 around the openings 8 and 9 on the side of the front side D3a of the tire rotation direction is stronger.

According to this, when the vehicle runs forward, since the projecting portion 5 on the side of the front side D3a of the tire rotation direction especially easily comes into contact with the ground, the traction performance when the vehicle runs forward can be enhanced. Especially on a rocky area, it is possible to enhance the traction performance when the vehicle runs on a rock using the projecting portion 5 on the side of the front side D3a of the tire rotation direction.

The pneumatic tire is not limited to the configuration of the embodiment described above, and the effects are not limited to those described above. It goes without saying that the pneumatic tire can be variously modified without departing from the scope of the subject matter of the present invention. For example, the constituents, methods, and the like of various modified examples described below may be arbitrarily selected and employed as the constituents, methods, and the like of the embodiments described above, as a matter of course.

In the pneumatic tire 1 of the embodiment, the openings 8 and 9 are separated from the both end edges of the projecting portion 5 in the tire radial-direction D2. However, the pneumatic tire is not limited to this configuration. For example, the openings may be placed up to the end of the projecting portion 5 in the tire radial-direction D2, and may be opened at the tire radial-direction D2.

In the pneumatic tire 1 of the embodiment, the center positions of the openings 8 and 9 in the tire circumferential-direction D3 are deviated from the center position of the projecting portion 5 in the tire circumferential-direction D3 toward the rear side D3b of the tire rotation direction. However, the pneumatic tire is not limited to this configuration. For example, the center positions of the openings 8 and 9 in the tire circumferential-direction D3 may be deviated from the center position of the projecting portion 5 in the tire circumferential-direction D3 toward the front side D3a of the tire rotation direction.

In the pneumatic tire 1 of the embodiment, all of the center positions of the openings 8 and 9 in the tire circumferential-direction D3 are deviated from the center position of the projecting portion 5 in the tire circumferential-direction D3 toward the rear side D3b in the tire rotation direction. However, the pneumatic tire is not limited to this configuration. For example, the center positions of the openings 8 and 9 in the tire circumferential-direction D3 may be deviated from the center position of the projecting portion 5 in the tire circumferential-direction D3 toward the front side D3a and/or the rear side D3b of the tire rotation direction, and/or may not be deviated (match with).

The pneumatic tire 1 of the embodiment includes not only the first projecting portion 5 but also the second projecting portion 6. However, the pneumatic tire is not limited to this configuration. For example, the pneumatic tire may include only the first projecting portion 5 and may not include the second projecting portion 6.

The pneumatic tire 1 of the embodiment has such a configuration that the first block 3 is not provided at its outer end in the tire width-direction D1 with the recess. However, the pneumatic tire is not limited to this configuration. For example, the first block 3 may be provided at its outer end in the tire width-direction D1 with a recess which is recessed with respect to the profile surface S2 only if the outer end edge of the second block 4 on the tread surface 13a in the tire width-direction D1 is located on the inner side in the tire width-direction D1 than the outer end edge of the first block 3 on the tread surface 13a in the tire width-direction D1.

The pneumatic tire 1 of the embodiment has such a configuration that the second projecting portion 6 does not have the opening. However, the pneumatic tire is not limited to this configuration. For example, the second projecting portion 6 may include the opening.

The pneumatic tire 1 of the embodiment has such a configuration that the openings 8 and 9 are provided in ½ of the plurality of projecting portions 5 and 6 (i.e., only first projecting portion 5). However, the pneumatic tire is not limited to this configuration. For example, the openings 8 and 9 may be provided only in one of the plurality of projecting portions 5 and 6. It is preferable that the openings 8 and 9 are provided at least in ¼ of the plurality of projecting portions 5 and 6, it is more preferable that the projecting portions 5 and 6 are provided at least in ⅓, and it is further more preferable that the projecting portions 5 and 6 are provided at least in ½.

The pneumatic tire 1 of the embodiment has such a configuration that all of the first projecting portions 5 have the same shapes and all of the second projecting portions 6 have the same shapes. However, the pneumatic tire is not limited to this configuration. For example, the first projecting portions 5 may have a plurality of different shapes, and they may be placed in sequence in the tire circumferential-direction D3. The second projecting portions 6 may have a plurality of different shapes, and they may be placed in sequence in the tire circumferential-direction D3.

The pneumatic tire 1 of the embodiment has such a configuration that the two openings 8 and 9 are provided in every one of the projecting portions 5. However, the pneumatic tire is not limited to this configuration. For example, one or three or more openings may be provided in every one of the projecting portions 5.

In the pneumatic tire 1 of the embodiment, the projecting portions 5 and 6 may be provided at least one of the pair of sidewall portions 12. For example, it is only necessary that the projecting portions 5 and 6 are provided at least in one of the sidewall portions 12 which is placed on the outer side when the pneumatic tire 1 is provided on the vehicle.

In the pneumatic tire 1, the projecting portions 5 and 6 are provided on both of the pair of sidewall portions 12, but the openings 8 and 9 may be provided in the projecting portion 5 of one of or both of the one sidewall portions 12. For example, the openings 8 and 9 may be provided at least in the projecting portion 5 of one of the sidewall portions 12 which is placed on the outer side when the pneumatic tire is mounted on the vehicle.

What is claimed is:
1. A pneumatic tire comprising:
a sidewall portion extending in a tire radial-direction; and
a tread portion having a tread surface on outer side in the tire radial-direction and connected to an outer end of the sidewall portion in the tire radial-direction, wherein
the tread portion includes a plurality of grooves extending to an outer end in a tire width-direction, and a plurality of blocks arranged in a tire circumferential-direction by being defined the blocks by the plurality of grooves,
the plurality of blocks includes a plurality of first blocks each having a first outer end edge within the tread surface in the tire width-direction and a plurality of second blocks each having a second outer end edge within the tread surface in the tire width-direction, the second outer end edges being disposed inwardly in the tire width-direction than from the first outer end edges,
the sidewall portion includes a plurality of projecting portions projecting in the tire width-direction,
the projecting portions are placed such that at least a portions of at least one of the projecting portions is superposed on one of the first blocks in the tire radial-direction as viewed in the tire width-direction,
the at least one of the projecting portions includes a first opening which is separated from both end edges of the at least one of the projecting portions in the tire circumferential-direction, and which is located at a position, within the at least one of the projecting portions, most projecting in the tire width-direction,
a center position of the first opening in the tire circumferential-direction is deviated from a center position of the projecting portion in the tire circumferential-direction,
the at least one of the projecting portions further includes a second opening which is separated from both end edges of the at least one of the projecting portions in the tire circumferential-direction,
the sidewall portion includes an annular protrusion portion projecting in the tire width-direction and extending along the tire circumferential-direction,
the first opening is placed on an inner side in the tire radial-direction than the annular protrusion portion,
the second opening is placed on an outer side in the tire radial-direction than the annular protrusion portion, and
each of the first and second openings becomes narrower in a width in the tire circumferential-direction as each of the first and second openings proceeds inwardly in the tire radial-direction.

2. The pneumatic tire according to claim 1, wherein the center position of the first opening in the tire circumferential-direction is deviated from the center position of the at least one of the projecting portions in the tire circumferential-direction toward a rear side of a tire rotation direction.

3. The pneumatic tire according to claim 1, wherein the center position of the first opening in the tire circumferential-direction is deviated from the center position of the at least one of the projecting portions in the tire circumferential-direction toward a front side of a tire rotation direction.

4. The pneumatic tire according to claim 1, wherein the projecting portions include a plurality of first projecting portions, at least a portions of at least one of the first projecting portions are superposed on one of the first blocks in the tire radial-direction as viewed in the tire width-direction, the projecting portions further include a plurality of second projecting portions, and at least a portion of at least one of the second projecting portions is superposed on one of the second blocks in the tire radial-direction as viewed in the tire width-direction, a projecting amount of the at least one of the first projecting portions in the tire width-direction is larger than a projecting amount of the at least one of the second projecting portions in the tire width-direction, the first opening is provided only in the at least one of the first projecting portions, and the first opening is not provided in any of the second projecting portions.

5. The pneumatic tire according to claim 4, wherein an outer end of the at least one of the first projecting portions in the tire radial-direction is located on an inner side in the tire radial-direction than the tread surface of the at least one of the first blocks.

6. The pneumatic tire according to claim 4, wherein an outer end of the at least one of the second projecting portions in the tire radial-direction is located at the same position as a bottom surface of the recess of the at least one of the second blocks in the tire radial-direction.

7. The pneumatic tire according to claim 4, wherein the first blocks and the second blocks are alternately placed in the tire circumferential-direction.

8. The pneumatic tire according to claim 1, wherein the at least one of the projecting portions is placed such that 25% or more of the at least one of the projecting portions in the tire circumferential-direction is superposed on one of the first blocks in the tire radial-direction as viewed in the tire width-direction.

9. The pneumatic tire according to claim 1, wherein a width size between an opening edge of the first opening and an end edge of the at least one of the projecting portions is 1.5 mm or more.

10. The pneumatic tire according to claim 1, wherein a gap between two neighboring projecting portions, out of the plurality of projecting portions, in the tire circumferential-direction becomes bigger as the gap proceeds inwardly in the tire radial-direction.

11. A pneumatic tire comprising:
a sidewall portion extending in a tire radial-direction; and
a tread portion having a tread surface on outer side in the tire radial-direction and connected to an outer end of the sidewall portion in the tire radial-direction, wherein
the tread portion includes a plurality of grooves extending to an outer end in a tire width-direction, and a plurality of blocks arranged in a tire circumferential-direction by being defined the blocks by the plurality of grooves,
the plurality of blocks includes a plurality of first blocks each having a first outer end edge within the tread surface in the tire width-direction and a plurality of second blocks each having a second outer end edge within the tread surface in the tire width-direction, the second outer end edges being disposed inwardly in the tire width-direction from the first outer end edges,
the sidewall portion includes a plurality of projecting portions projecting in the tire width-direction,
the projecting portions are placed such that at least a portion of at least one of the projecting portions is superposed on one of the first blocks in the tire radial-direction as viewed in the tire width-direction,
the at least one of the projecting portions includes a first opening which is separated from both end edges of the at least one of the projecting portions in the tire circumferential-direction, and which becomes narrower in width in a tire circumferential direction as the first opening goes more inwardly in the tire radial-direction,
a center position of the first opening in the tire circumferential-direction is deviated from a center position of the projecting portion in the tire circumferential-direction,
the at least one of the projecting portions further includes a second opening which is separated from both end edges of the at least one of the projecting portions in the tire circumferential-direction,
the sidewall portion includes an annular protrusion portion projecting in the tire width-direction and extending along the tire circumferential-direction,
the first opening is placed on an inner side in the tire radial-direction than the annular protrusion portion,
the second opening is placed on an outer side in the tire radial-direction than the annular protrusion portion, and
each of the first and second openings becomes narrower in a width in the tire circumferential-direction as each of the first and second openings proceeds inwardly in the tire radial-direction.

12. The pneumatic tire according to claim 11, wherein a gap between two neighboring projecting portions, out of the plurality of projecting portions, in the tire circumferential-direction becomes bigger as the gap proceeds inwardly in the tire radial-direction.

13. The pneumatic tire according to claim 11, wherein a gap between two neighboring projecting portions, out of the plurality of projecting portions, in the tire circumferential-direction becomes bigger as the gap proceeds inwardly in the tire radial-direction.

* * * * *